United States Patent [19]

Cassidy et al.

[11] Patent Number: 5,072,026

[45] Date of Patent: Dec. 10, 1991

[54] POLYUREAS BY REACTION INJECTION MOULDING OF ENAMINO-FUNCTIONAL ALIPHATIC POLYETHER RESIN-CONTAINING SYSTEMS AND AN ENAMINE-TERMINATED POLYETHER

[75] Inventors: Eduard F. Cassidy, Ukkel, Belgium; Herbert R. Gillis, Sterling Heights, Mich.

[73] Assignees: ICI Americas Inc., Wilmington, Del.; Imperial Chemical Industries, London, England

[21] Appl. No.: 400,424

[22] Filed: Aug. 30, 1989

Related U.S. Application Data

[63] Continuation-in-part of Ser. No. 378,445, Jul. 7, 1989, Pat. No. 4,935,460, which is a continuation of Ser. No. 242,745, Sep. 9, 1988, abandoned, which is a continuation-in-part of Ser. No. 160,647, Feb. 26, 1988, Pat. No. 4,794,129, which is a continuation-in-part of Ser. No. 105,641, Oct. 6, 1987, abandoned.

[30] Foreign Application Priority Data

Mar. 11, 1987 [GB] United Kingdom ............... 8705801
Sep. 9, 1988 [GB] United Kingdom ............... 8821181

[51] Int. Cl.$^5$ ............... C07C 229/30; C07C 229/32; C07C 229/46

[52] U.S. Cl. ............................... 560/171; 252/182.18

[58] Field of Search ................. 252/182.18; 560/171

[56] References Cited

U.S. PATENT DOCUMENTS

| | | | |
|---|---|---|---|
| 4,338,428 | 7/1982 | Alberino et al. | 528/73 |
| 4,342,841 | 8/1982 | Alberino et al | 521/163 |
| 4,469,857 | 9/1984 | John | 528/59 |
| 4,552,945 | 11/1985 | Alberino et al. | 528/62 |
| 4,935,460 | 6/1990 | Cassidy et al. | 252/182.18 |
| 4,946,922 | 8/1990 | Reisch et al. | 252/182.18 |

FOREIGN PATENT DOCUMENTS

| | | |
|---|---|---|
| 0081701 | 6/1983 | European Pat. Off. . |
| 0093862 | 11/1983 | European Pat. Off. . |
| 2125247 | 10/1972 | Fed. Rep. of Germany . |

OTHER PUBLICATIONS

Organic Chemistry, G. Marc Loudon, 1985, pp. 908–910

Primary Examiner—John Kight, III
Assistant Examiner—Rabon Sergent

[57] ABSTRACT

A reaction system is provided for use in forming polyureas by the reaction injection molding process which employs an enamino-functional polyether resin as a isocyanate-reactive component.

1 Claim, No Drawings

POLYUREAS BY REACTION INJECTION MOULDING OF ENAMINO-FUNCTIONAL ALIPHATIC POLYETHER RESIN-CONTAINING SYSTEMS AND AN ENAMINE-TERMINATED POLYETHER

This is a continuation-in-part of Ser. No. 07/378,445, filed July 7, 1989, now U.S. Pat. No. 4,935,460, which is a continuation of Ser. No. 07/242,745, filed Sept. 9, 1988, now abandoned, which is a continuation-in-part of Ser. No. 07/160,647, filed Feb. 26, 1988, now U.S. Pat. No. 4,794,129, which is a continuation-in-part of Ser. No. 07/105,641, filed Oct. 6, 1987, now abandoned.

This invention relates to compositions of matter used as reaction systems to make mouldings by a reaction injection moulding (RIM) process. The systems are useful for the production of polymeric materials, specifically moulded articles. The moulded polymeric articles comprise the product of the direct reaction of an aromatic isocyanate with an enamino-functional isocyanate-reactive composition.

Reaction injection moulded polyurea elastomers currently define an advanced state of the art in RIM technology. These polymeric materials are moulded from reaction systems which generally consist of two components, a polyisocyanate (which is usually aromatic), and a mixture of aromatic and aliphatic polyamines. The polyureas represent a major technological advance over earlier types of RIM systems (i.e. polyurethanes, urethane ureas, and polyamides) in that they offer a combination of superior material properties (i.e. heat resistance, moisture resistance, dimensional stability), with improved productivity (i.e. shorter mould-residence times).

Conventional polyurea reaction injection moulding (RIM) elastomer formulations are well known to the art. See, for example, U.S. Pat. Nos. 4,433,067, 4,396,729, 4,474,901, 4,444,910, 4,448,904, and European published patent application No. 0081701.

These polyurea RIM systems are "fast" systems in that they tend to gel early. They do not fill large, geometrically complex moulds without very high injection rates. Because of the fast gel times flow/fill problems frequently arise and can be particularly severe with formulations having theoretical hardblock levels above about 35% and containing primary aliphatic amines in the formulation. In particular, formulations above 35% hardblock which contain aliphatic amine-terminated polyether resins as the source of the softblock, or as added chain extenders, can present difficult processing problems. Formulations containing such aliphatic amine-terminated polyether resins are widely used in state of the art polyurea RIM technology.

In general, state-of-the-art polyurea systems which contain primary aliphatic amine groups exhibit poorer flow/fill characteristics than older prior art polyurethane-urea RIM systems, such as that described in U.S. Pat. No. 4,218,543. These older systems are similar to state-of-the-art polyurea systems in that they contain a sterically hindered aromatic diamine as a principal chain extender, but they do not generally require or contain primary aliphatic amine-containing species. Consequently not only do these older prior art systems exhibit better flow-fill characteristics, they generally also exhibit better mixing and are usually less demanding to process than current generation polyurea systems (i.e. when compared under similar conditions and at the same hardblock levels).

Conversely, apart from the disadvantages described above, state-of-the-art polyurea systems have several advantages over prior art polyurethane-urea systems. In particular they generally exhibit lower mould residence times, hence better productivity, and better physical properties can be obtained with the polyureas. In addition, the polyureas are more "robust", i.e. they can tolerate acidic additives because they do not depend upon sensitive catalysts as do the polyurethane ureas. The polyureas, as known in the art, are distinguished from the polyurethane ureas most fundamentally by the fact that substantially no urethane linkages are formed during the reaction injection moulding (RIM) operation.

It would be desirable to have polyurea RIM systems which exhibit flow-fill and mixing characteristics which are better than those of existing polyureas and, preferably, at least comparable to prior-art polyurethane urea systems. Speaking more generally, it would be highly desirable to have RIM processable reaction systems which offer at least some of the advantages of polyureas (i.e. heat resistance, robustness, short mould-residence times), without the disadvantages characteristic of the known polyurea systems (poor flow).

It would be preferable, however, that this improvement in flow not be achieved at the expense of much longer mould residence times. The requirements for improved flow/fill characteristics and constant mould-residence time ar mutually contradictory unless the reaction profile of such systems is changed. Simply reducing reactivity tends to decrease the flow/fill problems which naturally stem from the fast gel times of state-of-the-art polyurea systems, but also disadvantageously tends to increase the minimum necessary mould residence time.

State-of-the-art polyurea systems are faster than the earlier polyurethane-urea systems for a number of reasons, one being, as mentioned, the presence of fast-reacting primary aliphatic amine species which can react with aromatic isocyanates more than 100 times faster than aromatic amine chain extenders, such as diethyl toluene diamine, DETDA, normally used in polyurea and polyurethane urea RIM systems. State of the art polyureas generally have a higher cohesive energy density (CED), hence higher Tg, than corresponding polyurethane ureas of the prior art. The higher CED, coupled with higher chemical reactivity, make the polyureas gel faster than polyurethane-ureas. Often the gels which are first formed are physical rather than chemical gels. Physical gelation can be particularly problematic in polyurea systems which contain relatively high concentrations of aliphatic amine species, especially lower molecular weight aliphatic amine species. In polyurea systems which form distinct two-phase elastomers, phase separation may further interfere with flow/fill and mixing. Phase separation can occur very early if reactivity is high.

This invention provides reaction systems for use in making polymers by the reaction injection moulding process, said system comprising the following reaction components:

(A) an organic aromatic polyisocyanate; and (B) an isocyanate-reactive composition comprising at least one enamino-functional compound which has at least one enamino group that is directly reactive towards isocyanates and which conforms to the following structure

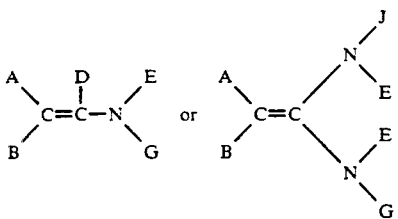

wherein each of A, B, D, E, G, J and L, independently, represents hydrogen or an optionally substituted hydrocarbon radical, and of A, B and D and, independently, and of E, G, J and L optionally being joined together to form one or more carbocyclic or heterocyclic rings.

In many preferred enamino-functional compounds, E, G, J and L are not hydrogen. It is also preferred that not both of A and B are hydrogen. Especially useful enamino-functional compounds contain two or more enamino groups as a result of any of A, B, D, E, G, J and/or L being a radical terminating in one or more enamino groups.

Suitable enamino-functional compounds may be obtained in known manner by reaction a carbonyl compound containing at least one alpha-hydrogen atom, for example an aliphatic, cycloaliphatic or araliphatic aldehyde or ketone such as acetaldehyde, propionaldehyde, isobutyraldehyde, caproaldehyde, cyclohexyl aldehyde, acetone, methyl ethyl ketone, benzyl methyl ketone, cyclopentanone, cyclohexanone, trimethylcyclohexanone, mixtures of these and the like with an aliphatic, cycloaliphatic, aromatic or heterocyclic secondary mono- or polyamine for example morpholine, piperazine or secondary amino-terminated polymers such as polyethers.

General techniques for the synthesis of enamines have been described in, for example, Org. Coatings and Plastics Chem., 44, 151 and 157, (1981), ACS-PMSE preprints, August/September 1983, 456 and 461, and U.S. Pat. Nos. 4,342,841 and 4,552,945.

The organic polyisocyanates, component (A), useful in this invention suitably have a number-averaged isocyanate functionality from 1.8 to 4.0, preferably from 1.9 to 2.3, and a number-averaged molecular weight between about 120 and about 1800, preferably between about 170 and about 800. At least 50 mole percent, preferably at least 90 mole percent, of isocyanate groups in the species comprising the polyisocyanate are bonded directly to aromatic rings. At least 50 mole percent, preferably at least 70 mole percent, of the species comprising the polyisocyanate are diisocyanates.

Unless otherwise stated, the expressions "equivalent weight" and "molecular weight" as used throughout the present specification refers to the equivalent weight values as may be calculated by measuring the content of functional groups per weight of polymer sample, and to the molecular weight values as may be calculated from the thus obtained equivalent weight and the theoretical functionality of the polymers.

Suitable aromatic polyisocyanates include, for example, p-phenylene diisocyanate; m-phenylene diisocyanate; 2,4-toluene diisocyanate; 2,6-toluene diisocyanate; naphthalene diisocyanate; dianisidine diisocyanate; polymethylene polyphenyl polyisocyanates; 2,4'-diphenylmethane diisocyanate (2,4'-MDI); 4,4'-diphenylmethane diisocyanate (4,4'-MDI); 3,3'-dimethyl-4,4'-biphenylene diisocyanate; polydiphenylmethane diisocyanate having a functionality greater than 2, mixtures thereof and the like. The MDI isomers (2,4' and 4,4') and mixtures and derivatives thereof are most preferred.

The polyisocyanate may include minor amounts of aliphatic polyisocyanates. Suitable aliphatic polyisocyanates include isophorone diisocyanate; 1,6-hexamethylene diisocyanate; 1,4-cyclohexyl diisocyanate; saturated analogues of the above mentioned aromatic polyisocyanates, mixtures thereof and the like.

Suitable uretonimine-modified polyisocyanates can be used and are prepared by a process wherein an aromatic polyisocyanate is heated to a temperature exceeding the melting temperature of the polyisocyanate, for example, 140° C., in the presence of a carbodiimide catalyst to convert some of the isocyanate groups to carbodiimide groups and then allowing the carbodiimide groups to react with unreacted isocyanate groups to form uretonimine groups.

Suitable isocyanate-terminated prepolymers can be used and are prepared by reacting an excess of polyisocyanate with polyols, which may include aminated polyols. Suitable polyols include, for example;

(a) polyether polyols and/or hydrocarbon-based polyols having a molecular weight from 60 to 500, and an average hydroxyl functionality from 1.9 to 2.5;

(b) polyether (and/or thioether) polyols having a molecular weight of at least 500, preferably 1000 or higher, and an average hydroxyl functionality from 1.9 to 4;

(c) polyester polyols having a molecular weight from 100 to 1000, and an average hydroxyl functionality from 1.9 to 2.5;

(d) polyester polyols having a molecular weight greater than 1000, and an average hydroxyl functionality from 1.9 to 4;

(e) amine terminated polyethers having a molecular weight of at least 1000, and an average amine hydrogen functionality from 1.9 to 8.

Examples of suitable polyether or hydrocarbon polyols having a molecular weight from 60 to 500 include propylene glycol; dipropylene glycol; tripropylene glycol; 2,3-butanediol; 1,3-butanediol, 2,2-dimethyl-1,3-propanediol and polypropylene glycols. Examples of suitable polyether polyols having a molecular weight of at least 500, preferably 1000 or higher, include polyethylene glycols; poly-oxyethylene polyoxypropylene copolymer diols; and polytetramethylene glycols, higher polypropylene glycols, polyoxypropylene triols, etc. The poly-oxypropylene based polyols are preferred.

Example of suitable polyester polyols having a molecular weight from 100 to 1000 include aliphatic polyester diols, and aromatic polyester diols. These polyester diols are obtained from the reaction of dibasic carboxylic acids such as succinic, adipic, suberic, azelic, phthalic, isophthalic, and the like, with alkylene glycols and oxyalkylene glycols to form the corresponding polyalkylene, and polyoxyalkylene ester diols or copolymers thereof. Examples of suitable polyester polyols having a molecular weight of at least 1000 include the polyester diols and triols obtained from the reaction of polybasic carboxylic acids, and alkylene polyols and/or oxyalkylene polyols, to form the corresponding polyalkylene and polyoxyalkylene esters or copolymers thereof having a molecular weight of at least 1000. The polybasic carboxylic acids used may be aliphatic, aromatic, or both.

Mixtures of several species from the above (a)-(e) and the like may be used to prepare prepolymers for use in the A component. Mixtures of species of type (b) with species of type (e) are preferred.

Examples of suitable amine terminated polyethers having a molecular weight of at least 1000 include polypropylene oxide triamines, polyoxypropylene diamines, and polyoxyethylene/polyoxypropylene copolymer diamines and triamines.

The (A) stream can contain a carboxylic acid (e.g. a fatty acid such as lauric, stearic, palmitic, oleic, and the like) or latent acid (e.g. an anhydride of any of the preceding acids or cyclic acid anhydrides, such as cis-1,2-cyclohexanedicarboxylic acid anhydride) to promote the reaction between the polyisocyanate and aliphatic enamino-functional ingredients from stream (B). The level of such acids can be about 0.01 to 4% by weight of the total polymer. The range of total softblock content in the polymer material (as a percent by weight of the total polymer) may range from about 10 to about 95%, preferably 20 to 80%, and most preferably 30 to 70%.

The B component of this invention is an isocyanate-reactive composition which comprises at least one enamino-functional compound capable of reacting directly with aromatic isocyanates, present as a softblock component and/or as a chain extender. If an enamino-functional compound is present as a chain extender, it will in general be an enamino-functional compound having a molecular weight less than 1000, preferably less than 600. If an enamino-functional compound is to be used in the softblock (or rubbery phase), it will in general be an enamino-functional aliphatic polyether resin with a molecular weight of at least 1000, preferably 2000 to 8000, and a number-averaged functionality of enamino groups of at least 1.1, preferably from about 2 to about 4.

This invention provides a reaction system used to make polyureas by a reaction injection moulding process,
  (i) a chain extender, and
  (ii) an enamino-functional polyether resin having an average of from about 1.1 to about 5 isocyanate-reactive enamino groups per molecule and a number-averaged molecular weight of from 1000 to about 10,000, wherein said enamino groups constitute at least 50 mole percent of the isocyanate-reactive groups in said polyether resin, and at least 50 mole percent of said enamino-functional polyether species contain two or more enamino groups per molecule;

wherein said system is used to make a polymer by impingement mixing a stream comprising said reaction component (A) and a stream comprising said reaction component (B). It is within the scope of the invention to have reactant B(ii) assume any weight fraction of the total B component. It is preferred, however, that the weight ratio of reactant B(i) to reactant B(ii) be in the range of about 9:1 to about 1:9, and most preferred that this ratio be in the range of 8:2 to 2:8.

It is further within the scope of the invention to use a softblock component in B(ii) which is not enamino functional in conjunction with an enamino functional chain extender, or to pre-react the (enamino functional or non-enamino functional) softblock component with a stoichiometric excess of the polyisocyanate "A" component, thereby forming an isocyanate-terminated prepolymer.

In a preferred embodiment this invention also provides a substantially moisture-free isocyanate-reactive composition comprising the following isocyanate-reactive components
  (i) an aromatic polyamine having a number-averaged functionality of aromatically bound primary and/or secondary amine groups of from about 1.8 to about 3.0, a number-averaged molecular weight of from about 100 to about 400, and wherein at least 50 mole percent of the species comprising said polyamine are diamines; and
  (ii) an enamine-terminated aliphatic polyether having an average of from about 1.1 to about 4 enamine groups per molecule and a number-averaged molecular weight of from about 1000 to about 10,000, wherein said enamine groups are capable of reacting directly with isocyanates, and wherein said enamine groups constitute at least 50 mole percent of isocyanate-reactive functional groups in said polyether and at least 50 mole percent of the enamine-terminated species comprising said mixture are di-enamines and/or tri-enamines, the weight ratio of said reactant (i) to said reactant (ii) being in the range of about 9:1 to about 1:9.

This invention further provides polyureas and moulded articles made therefrom using the reaction systems and isocyanate-reactive compositions noted above.

"Reaction System" as used herein means a system or assemblage of reaction components which, in the system, are unreacted but which, in use, are reacted with each other in a device which provides for impingement mixing, to form a moulded product. "RIM" as used herein refers to a reaction injection moulding process wherein the reactants, present as a polyisocyanate "A" component and an isocyanate-reactive "B" component, are impingement mixed and injected into a closed mould.

"Moisture free conditions" and "moisture free" as used above means that the reactants employed are substantially anhydrous and that the processing equipment used is also substantially anhydrous.

"Polymer", as used herein and in the claims, means the reaction product of a reaction system according to this invention. Such polymers contain at least one moiety or portion derived from the reaction of an isocyanate group with an enamine group. Such polymers can also contain other groups or linkages such as urethane, amide, urea, biuret, allophanate, triazine, and or isocyanurate groups.

"Directly reactive" as applied to the enamino functional compounds useful herein means that the enamino groups are capable of reacting with aromatic isocyanate groups in such a way as to form at least one chemical bond between the groups without prior cleavage or hydrolysis of the enamino groups. Hence, no by-products are produced in the reaction.

The term "polyisocyanate" encompasses mixtures comprising two or more species of isocyanate, as well as compositions consisting of a single polyisocyanate species. The terms "an aromatic polyamine", "an enamino-terminated aliphatic polyether" and "an enamino-functional chain extender" are used in like manner, i.e. to denote mixtures of species as well as single species thereof.

The terms "alkyl", "alkylene", and "aliphatic" used herein refer to cyclic as well as acyclic non-aromatic organic structures, i.e., structures or molecules which are free of aromatic rings and not part of aromatic rings.

The reaction systems of this invention are generally processed in bulk to form a high density polymer in a single step from the liquid monomeric components A and B. Generally, no solvent is used to moderate reaction rate. This does not, however, preclude the use of certain ingredients normally used in the processing of bulk thermosetting polyurethanes, polyureas, and related isocyanate-derived polymers of the prior art which are also prepared by impingement mixing. These additives are known to those skilled in the art, and include monomeric liquids such as plasticizers, flame retardants, catalysts, volatile blowing agents and the like.

Component (B)(i) useful herein is in general a chain extender. Preferred chain extenders include aromatic polyamines, having a molecular weight less than 1000, and mixtures thereof.

Aromatic polyamines useful as chain extenders in this invention have a number-averaged functionality of aromatically bound primary and/or secondary isocyanate reactive amine groups of from about 1.8 to about 3.0, preferably from 1.9 to 2.2, and a number averaged molecular weight which ranges from about 100 to about 500, preferably between 122 and 300. At least about 50 mole percent, preferably at least 80 mole percent, of the species comprising said polyamine are diamines. Preferably, at least about 95 mole % of amine groups, whether primary or secondary, are aromatically bound.

Examples of suitable aromatic polyamines include 3,5-diethyl-2,4-toluenediamine; 3,5-diethyl-2,6-toluenediamine;
DETDA which is a mixture of about 80 percent by weight 3,5-diethyl-2,4-toluenediamine and about 20 percent by weight 3,5-diethyl-2,6-toluenediamine; 1,3,5-triethyl-2,6-diaminobenzene; 2,4-diaminotoluene; 2,6-diaminotoluene; 2,4'-diamino-diphenylmethane; 4,4'-diamino-diphenylmethane; 3,3'dimethyl-5,5'-diethyl-4,4'-diaminodiphenylmethane; 3,3',5,5'-tetraisopropyl-4,4'-diamino diphenyl-methane polyphenyl-polymethylene polyamines; and the like.

Aliphatic low molecular weight polyamine compositions may also be employed, in minor amounts not exceeding 40% by weight based upon the total weight of ingredients B(i)+B(ii), preferably less than 20%, more preferably less than 10%, and most preferably less than 1%, as an optional chain extender in stream (B). Useful aliphatic amines contain acyclic, linear or branched chains of atoms between reactive (primary and/or secondary) amine groups. These amine groups (by definition) are bonded directly, via the amine nitrogen atom, to aliphatic carbon atoms of the connecting structure. The number-averaged molecular weight of the aliphatic polyamine (or mixture of aliphatic polyamines) used in this invention is less than about 1000, preferably between 200 and 450. The number averaged isocyanate-reactive amine functionality is between 1 and 3, preferably between 2 and 2.3. The aliphatic polyamine composition should preferably be at least 50 mole percent, preferably at least 70 mole percent, diamines.

It is preferred that the aliphatic amine composition be substantially free of individual (reactive amine-containing) molecular species of molecular weight less than 170. If molecular amine species of molecular weight lower than 170 are present, they should constitute less than 20% by weight of the total aliphatic amine composition, and less than 5% of the total polyurea composition (by weight, relative to the total weight of reactive components).

It is preferred that a majority of any primary aliphatic amine groups within the aliphatic amine composition, most preferably greater than 80% of these primary amine groups, are bonded directly (via the amine nitrogen atom) to secondary and/or tertiary carbon atoms.

Examples of suitable aliphatic polyamines include the amine-terminated polyethers such as those represented below:

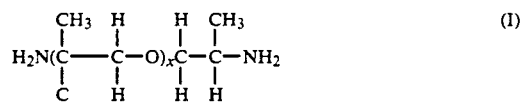

wherein x has an average value between 2 and about 6.

Polyether diamines such as Formula I, above, may be used as mixtures with higher functionality polyether polyamines such as Formula II (below), provided that the mixture meets the requirements of number averaged amine functionality and molecular weight described previously:

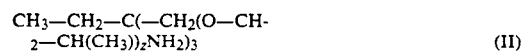

wherein z has an average value between about 1 and about 2. Component (B) (i) may also contain imino-functional compounds having molecular weights less than 1500. Such compounds contain at least one isocyanate-reactive imino group per molecule and conform to the general structure:

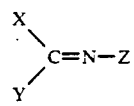

wherein

X, Y, and Z are chemical moieties which collectively form the rest of said compound and are each independently selected from the group consisting of H and organic radicals which are attached to the imino unit

of said compound through N, C, O, S, Si or P; being the central carbon atom of said imino unit is bonded to three atoms.

In the above structure, neither the carbon nor the nitrogen atom of the imino unit should be incorporated within an aromatic or other fully conjugated ring or ring system. It is preferred that Z is attached to the imino unit through carbon and that X and Y are independently H or organic radicals attached through an atom selected from C, N, and O. It is most preferred that X, Y and Z are attached through saturated atoms, preferably aliphatic carbon atoms.

Many types of imino-functional compounds are useful as co-reactants in this invention, including (but not limited to) those listed in Table A, following:

TABLE A

| | TYPE |
|---|---|
| ⓅR⁵—C=N—R⁷<br>                      \|<br>                      R⁶ | Simple imine |
| Ⓟ—R⁵—O—C=N—R⁷<br>                     \|<br>                     R⁶ | Imino ester |
| Ⓟ—Ar—O—C=N—R⁷<br>                     \|<br>                    R⁶ | Imino ester (aromatic) |
|         R⁶<br>        \|<br>Ⓟ—R⁵—N=C<br>        \|<br>        R⁷ | Simple imine |
| Ⓟ—R⁵—NR⁶—C=N—R⁸<br>                         \|<br>                        R⁷ | Amidine |
|         R⁶<br>        \|<br>Ⓟ—R⁵—N=C<br>        \|<br>        Ar' | Simple imine (aromatic) |
| Ⓟ—R⁵—NR⁶—C=N—Ar'<br>                         \|<br>                        R⁷ | Amidine (aromatic) |
| Ⓟ—R⁵—C=N—R⁶<br>                \|<br>               OR⁷ | Imino ester (aliphatic) |
| Ⓟ—R⁵—C=N—R⁶<br>                \|<br>               OAr' | Imino ester (aromatic) |
| Ⓟ—R⁵—NH—C=NR⁶<br>                     \|<br>                    NHR⁶ | Guanidine |
|                         NR⁸<br>                       /<br>Ⓟ—R⁵—NR⁷—C<br>                       \\<br>                       NR₂⁸ | Guanidine |
| Ⓟ—R⁵—NH—C=NAr'<br>                   \|<br>                    NHAr' | Guanidine (aromatic) |
| Ⓟ—R⁵—O—C=N—R⁶<br>                    \|<br>                   NHR⁶ | Isourea |
| Ⓟ—R⁵—O—C=N—R⁷<br>                    \|<br>                   NH₂ | Isourea | wherein:

$R^5$ and Ar are divalent aliphatic and aromatic organic linking groups, respectively;

Ⓟ represents an organic chain or radical, to which said imino (C=N) functional group is attached as indicated by the drawings.

$R^6$ is H or a monovalent organic aliphatic group of 1 to 10 carbons;

$R^7$ and $R^8$ are monovalent aliphatic organic groups of 1 to 10 carbon atoms, and Ar' is a monovalent aromatic organic group of 6 to 18 carbon atoms.

These stated groups are well known in the art. Thus $R_5$ may in particular be propylene, Ar methoxyphenylene, $R_6$ propyl, $R_7$ propyl, $R_8$ propyl and Ar' methoxyphenyl.

It is noted that in the above formulas any two of the three substituents attached to the imino unit can be incorporated as members of a non-aromatic 5 or 6 membered ring. The ring can be carbocyclic or heterocyclic depending, of course, on the particular substituents so incorporated and on whether the carbon or the nitrogen atom (or both) of the imino unit are also incorporated.

When aromatic groups are present in the imino unit it is preferable that they be attached to the carbon atom of said unit and it is most preferred that said aromatic group bear electron donating substituents such as hydroxy, alkoxy N,N-dialkyl-amino etc.

The preparation of these imino functional groups in both cyclic and acyclic forms is well known in the literature.

The preferred enamino-terminated polyethers used as component (B) (ii) herein can be made by reacting an aldehyde or ketone having at least one alpha-hydrogen atom with a secondary amino-terminated polyether having an appropriate molecular weight to give an enamino-functional polyether having a molecular weight of from 1500 to about 10,000. Particularly suitable polyethers comprise polyoxypropylene chains terminating in 2 or 3 secondary amino groups.

The polyether based resins used to prepare component B(ii) may also contain groups other than ether linkages. For example, amide linkages, thioether linkages, imide linkages, siloxane linkages, and so forth, provided that these are chemically inert towards the aliphatic enamine end groups.

Suitable enamino-terminated polyethers may also be prepared by reacting ketone-terminated polyethers containing alpha hydrogen atoms (obtained by the oxidation of polyether polyols) with secondary amines, for example morpholine or piperidine.

Other suitable enamino-terminated polyethers have, for example, the general structure:

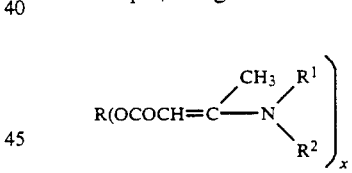

wherein R is the residue remaining after removal of the hydroxyl group from a polyether polyol, R' represents hydrogen or optionally substituted hydrocarbon radical, $R^2$ represents hydrogen or an optionally substituted hydro-carbon radical or R' and $R^2$ together with the attached nitrogen atom form a heterocyclic ring, and x is an integer from 2 to 5, especially 2 or 3. These enamino-terminated polyethers may be prepared by reacting polyether polyols, for example polyoxypropylene diols or triols with ethyl acetoacetate and then reacting the product with ammonia, a primary amine $R'NH_2$ or a secondary amine $R'R_2NH$.

The enamino-terminated polyether preferably has a number-averaged enamine functionality of from about 1.6 to about 3, and the enamine groups comprise at least 50 mole percent, preferably at least 70 mole percent, of isocyanate-reactive functional groups present therein.

It is further preferred that the number-averaged molecular weight of the enamine-terminated polyether softblock be between 2000 and 8000, and that the polyether be substantially free of components having a molecular weight less than about 1000. It is further preferred that at least 70 mole percent of the enamine-terminated molecules comprising the polyether be di-enamines and/or tri-enamines.

In addition to the enamino-functional polyethers described above, the reaction system stream (B) may also contain supplemental higher molecular weight isocyanate-reactive hydrogen-containing material. A preferred group of active hydrogen-containing materials useful as optional softblock resins have an average molecular weight of at least 1000, preferably at least 2000 up to about 10,000, an average active hydrogen group functionality from 2 to 6, preferably from 2 to 3, active hydrogen-containing groups wherein at least 70 percent, preferably at least 85 percent, of the groups are primary and/or secondary aliphatic and/or aromatic amine groups. The amount of these supplemental high-molecular-weight isocyanate-reactive materials in component B should be less than 50% by weight of the amount of component B(ii), preferably less than 25%, and most preferably less than 10%. The ratio of the number of active hydrogen containing groups in this supplemental high-molecular-weight resin to the number of enamine and/or imino groups in component B(ii) is less than 0.5, preferably less than 0.25, and most preferably less than 0.1:1.

Examples of suitable supplemental high molecular weight active hydrogen-containing materials include amine terminated polyethers, amine terminated organopolysiloxanes, amine terminated polymers with hydrocarbon main chain, amine terminated polyamides, and the like. Suitable amine terminated polyethers have a molecular weight of about 1000 to about 10,000, and are made from an appropriate initiator such as glycerol, ethylene glycol or trimethylolpropane, to which lower alkylene oxides such as ethylene oxide, propylene oxide, butylene oxide or mixtures thereof are added. The resulting hydroxyl terminated polyol is then aminated. When two or more oxides are used, they may be present as random mixtures or as blocks of one or the other polyether. Normally, the amination step does not completely replace all of the hydroxyl groups. For use in the invention, compounds having at least 70 percent of the hydroxyl groups converted to primary and/or secondary amine groups are preferred and those having at least 85 percent are most preferred. Amination of the polyol may be accomplished by a large number of prior art methods, for example, by reductive ammination or by cyanoethylation followed by hydrogenation of the nitrile end groups.

If it is desired to reductively amminate a polyethylene oxide polyol, it is desirable to cap the hydroxyl terminated polyol with a small amount of higher alkylene oxide so that the terminal hydroxyl groups are secondary hydroxyl groups. The polyols so prepared are then reductively aminated by prior art techniques, for example, as disclosed in U.S. Pat. No. 3,654,370, incorporated herein by reference.

A single high molecular weight amine terminated polyether may be used. Also, mixtures of amine terminated polyethers such as mixtures of di- and tri-functional materials and/or different molecular weights or different chemical composition materials may be used.

Suitable amine terminated organopoly siloxanes include, for example, those represented by the polysiloxane material PS-513, which is commercially available from Petrarch Systems Inc. This is a linear polydimethyl siloxane fluid which contains terminal aminopropyl groups. The material is a diprimary diamine having a molecular weight of about 28,000.

Suitable amine terminated reactive liquid polymers having hydrocarbon main chains are disclosed in U.S. Pat. No. 4,535,147, which is incorporated by reference. An example of such an amine terminated reactive liquid polymer is represented by the polymers commercially available from B. F. Goodrich as HYCAR ATBN 1300×16 and HYCAR ATBN 1300×21.

Stream (B) may further comprise hydroxyl-containing species such as one or a mixture of polyols which have an average molecular weight of at least 1000 and an average hydroxyl functionality from 2 to 8. The total of hydroxyl groups amount to less than 30 percent, equivalents basis, of the enamino plus imine groups in component B(ii), preferably less than 15 percent. Examples of suitable high molecular weight polyols include, for example, hydroxyl terminated polyoxypropylene; polyoxypropylene-polyoxyethylene copolymers; polyoxypropylene-polyoxybutylene copolymers; and polytetramethylene oxide diols. The amount, by weight, of these polyols should not exceed 50% of the weight of the enamine-terminated polyether resin (B-ii), and preferably should be less than 25%, most preferably less than 10%, of the weight of B(ii).

Other species which may be present in the B stream include imino-functional resins having an average of from about 1.1 to about 5 isocyanate-reactive imino groups (as hereinbefore defined) per molecule and molecular weights of from 1000 to about 10,000. Examples are imino-functional polyethers, having molecular weights of from about 1000 to about 8000 and from about 2 to about 5 imino units per molecule. These may be obtained by reacting polyether polyamines, especially polyoxypropylene primary diamines or triamines, with aldehydes or ketones.

The reaction systems of the present invention can further include additives such as internal mould release agents, catalysts, surfactants, blowing agents, fillers (which may be reinforcements), plasticizers, fire retardants, coupling agents, and the like.

Suitable internal mould release agents include, for example, copper stearate, zinc stearate and a dimethyl polysiloxane with organic acid groups which is commercially available as Dow-Corning Q2-7119 from Dow-Corning Corporation. Other organo-polysiloxanes bearing organic hydroxyl groups (instead of acids) can also be used. A specific example of a very effective, hydroxy functional, polysiloxane internal mould release additive is L-412T (available from Goldschmidt AG). The amount of internal mould release agent used can be from about 0.001 to about 5.0 percent by weight of the total reactants (i.e. total polymer).

Catalysts are generally not required during the preparation of polyureas by RIM. Catalysts may, however, be used if desired. Suitable catalysts include, for example, tertiary amines or organotin compounds, such as dibutyltin dilaurate, dibutyltin diacetate, diethyltin diacetate, dihexyltin diacetate, di-2-ethylhexyltin oxide, stannous octoate, stannous oleate, or a mixture thereof.

Tertiary amine catalysts include trialkylamines which include, for example, triethylamine; heterocyclic amines such as N-alkylmorpholines which include, for example, N-methylmorpholine, N-ethylmorpholine; 2,2'-bis(dimethylamino)diethyl ether; 1,4-dimethylpiperazine, triethylenediamine, and aliphatic polyamines such as N,N, N',N'-tetramethyl-1,3-butanediamine, or alkanolamines such as N-methyl diethanolamine. The amount of catalyst used will generally be less than about 5 percent by weight of the total reactants, preferably less than 1%. Combinations of tertiary amine and organotin catalysts are frequently used in the art. Isocyanurate catalysts, such as alkali and/or alkaline earth metal salts of carboxylic acids, may also be added to the formulations of the invention.

Suitable surfactants include, for example, sodium salts of castor oil sulfonates; alkali metal or ammonium salts of sulfonic acids such as dodecyl benzene sulfonic acid; and polyether siloxanes having a structure such that a copolymer of ethylene oxide and propylene oxide is attached to a polydimethyl siloxane radical. The amount of surfactant used is less than about 2 percent by weight of the total reactants, preferably less than 1%.

Suitable blowing agents include, for example, dissolved or dispersed gasses such as air, $CO_2$, $N_2O$, or nitrogen, and low boiling halogenated hydrocarbons such as methylene chloride and trichloromonofluoromethane. The amount of blowing agent used is preferably less than about 4 percent by weight of the total reactants.

Suitable fillers include fibreglass reinforcement fibres, particularly those having lengths of from about 1/16 inch (0.16 cm) to about ½ inch (1.27 cm) and milled glass fibers having a length of 1/16 inch (0.16 cm), ⅛ inch (0.32 cm) or ¼ inch (0.64 cm) and the like. Shorter fibres are always preferred for ease of processing when they are incorporated as part of the "A" or "B" component streams. Other particularly suitable fillers are mica, fumed silica, flake glass, Wollastonite, calcium carbonate, carbon black, and the like.

The reaction systems and polymers of this invention are mixing activated systems which are processed by the reaction moulding (RIM) process in a RIM machine. The invention provides improved control (improved flow characteristics and improved mixing quality) in fast reacting, fast gelling systems. Accordingly, the invention is directed to reaction systems having gel times, under the conditions of processing, less than about 1 minute, preferably less than 30 seconds, more preferably less than 20 seconds, and most preferably less than 10 seconds. The reaction systems of this invention can be used to make polyureas which are shapable by RIM into useful articles such as automobile fascia and panels.

RIM machines are well known in the art and include those supplied by Admiral Equipment Corp., Akron, Ohio by Cincinnati Milacron Corp., Cincinnati, Ohio, by Battenfeld GmbH, Meinerzhagen, West Germany and by Krauss Maffei GmbH, West Germany.

The reagents may be blended in a suitable container and agitated at a temperature from about 20° C. to about 100° C. It is preferred to mix and process the ingredients of component (B) at or near ambient (20° C.) temperature. Ingredients B(i) and B(ii) should preferably not be heated (together) once mixed.

The "A" and "B" Components are placed in separate containers, which are generally equipped with agitators, of the RIM machine wherein the temperature of the "A" Component is 20° C. to about 125° C. It is preferred that the isocyanate temperature used for processing and mixing be below about 50° C., particularly if the isocyanate contains a catalyst or latent catalyst for the enamine-isocyanate reaction. The temperature of the "B" Component can be between about 20° C. to about 80° C., but is preferably about 20° C. to about 40° C.

The "A" Component and "B" Components are impingement mixed in a forced mix head such as, for example, a Krauss-Maffei mix head. The "A" and "B" Components are pumped to the mix head by a metering pump, for example, a Viking Mark 21A, at a discharge pressure from about 700 to about 5000 psi. It is sometimes necessary to maintain the component streams (A and B) within the pistons (or pumps), mix head, and all conduits connecting these components, at temperatures comparable to those which prevail within the storage tanks. This is often done by heat-tracing and/or by independent recirculation of the components.

The amounts of the "A" and the "B" Components pumped to the mix head is measured as the ratio by weight of the "A" Component to the "B" Component wherein the ratio is from about 9:1 to about 1:9, preferably from 3:1 to 1:3, depending upon the reactants used and the isocyanate index desired. It is preferred that a weight ratio be employed which yields a ratio of isocyanate equivalents in stream (A) to isocyanate-reactive functional groups in stream (B) between 0.70 and 1.90, preferably 0.90 to 1.30, more preferably 0.95 to 1.20. This ratio of equivalents is known as the index and is often expressed as a percentage. The expression "isocyanate-reactive-functional-groups" are defined herein to include imine groups, primary and/or secondary amine groups (aromatic or aliphatic), hydroxyl groups, enamine groups, ketene aminal groups, mercapto(—SH) groups and carboxylic acids, said groups being organically bound.

Either or both streams may contain up to 40% of its weight in solid fillers or reinforcements. In a preferred embodiment, each stream contains at least 70% by weight of reactive species, not more than 30% by weight of fillers and/or reinforcements, and not more than 10% of other optional additives.

The impingement mixed blend of "A"/"B" streams is injected into a mold at a velocity from about 0.3 lb./sec. to about 70 lb./sec., preferably 5 to 20 lb./sec. The mould is heated to a temperature from about 20° C. to 250° C. Suitable moulds are made of metal such as aluminium or steel, although other materials can be used if they can withstand the processing conditions and wear. Usually an external mould release agent is applied before the first moulding. These are usually soaps or waxes which are solid at the mould temperature employed.

A moulded polymer article is formed after the impingement mixture is in the mould from about 1 second to about 30 seconds, preferably 5 to 20 seconds. The mould is then opened and the moulded product is removed from the mould. The moulded product may be post cured by placing the product in an oven having a temperature between 50° C. and about 250° C. for a time from about one-half hour to about 3 hours.

Mould filling may be accomplished in this invention in a more facile manner due to the reaction profile of the systems disclosed herein. Generally there is an induction period of about 1 to 5 seconds, usually 1 to 3 seconds, during which the reaction between the isocyanate- and the enamino-functional ingredients is flat or retarded. Following this induction period the reaction accelerates noticeably. This behaviour is in sharp contrast to that of the primary aliphatic amines used in the polyurea systems of the prior art. These amines appear to begin reacting with aromatic isocyanates on contact. These reaction profiles can be visualised by means of the adiabatic temperature-rise technique, which involves dispensing reaction systems (or two or more individual ingredients) through an impingement mixing device into a insulated cup equipped with thermocouples. The temperature rise due to the reaction is then monitored, at intervals of 0.1 sec. or less, and plotted versus time. Of course, as expected, the induction periods are most clearly evident when the enamine compounds are reacted neat (i.e., free of other ingredients) with the aromatic isocyanates. Moulded objects can be demanded after a mould residence time of 30 seconds, often 15 seconds or less at a mould temperature less than 350° F., preferably less than 180° F.

Although not essential to the successful practice of this invention, it is within the scope of the invention to incorporate reactive ingredients into the reaction systems of the invention, in minor amounts, which are different from the types of reactants specifically described herein.

The individual components of the reaction systems are desirably stored and processed under an inert atmosphere such as dry air or nitrogen.

The formulations of the invention are processed at an isocyanate index between 0.70 and 1.90, preferably between 0.95 and 1.20; with the proviso that, if a catalyst for the conversion of isocyanate to isocyanurate groups is present, the index may extend up to about 15.00. Examples of suitable isocyanurate catalysts include alkali metal salts of carboxylic acids, for example, potassium 2-ethylhexoate.

In addition to polyurea RIM, the flow and property advantages and the resulting improvements in processability provided by the reaction systems of the invention make then well suited for use in mat reinforced structural/RIM systems (SRIM). In these systems, a continuous mat of reinforcing fibers is placed in the mould and the reaction system is pumped through and around this mat, thereby providing a composite with mechanical reinforcement. The flow requirements for SRIM can therefore be quite demanding. The mats are generally made of glass fibres, but metallic fibres, aramid fibres, carbon fibres, Nylon fibres, combinations of these, and the like may be used. The individual fibres can be quite long relative to reinforcements which can be incorporated via individual component monomer streams, comparable to or longer than the moulded part itself when fully extended. The polyurea systems of the invention are well suited to the demanding process requirements of SRIM.

EXAMPLE 1

Preparation of an enamino-functional polyether a. Preparation of poly(oxypropylene)acetoacetate A 10 l round bottomed flask in a temperature controlled heating mantle was fitted with a mechanical stirrer, a nitrogen sparge and a vigreux column with Liebig condensor. The flask was charged with 9000 g of a 5000 molecular weight poly(oxypropylene)triol based on glycerol, 782 g of ethylacetoacetate and 3 ml of tetrabutyltitanate catalyst. The reaction mixture was heated to 160°-170° C. with a gentle sparge of nitrogen. The progress of reaction was monitored by infrared analysis of the condensed volatiles produced during the reaction. After 440 minutes, a further 500 g of ethylacetoacetate and 2 ml of tetrabutyltitanate were added to the reaction mixture. After 690 minutes a sample of distillate contained mainly ethanol as indicated by a peak at 3350 cm$^1$ in the infrared spectrum of the sample. After 810 minutes the vigreux column was removed and heating was continued. Analysis of the distillate at this point showed this material to be mainly ethylacetoacetate. The excess ethylacetoacetate was then removed by the application of vacuum. After all of the volatile components had been removed the product was shown to have a hydroxyl value of 3.5 MgKOH/g indicating greater than 90% conversion to the poly(oxypropylene) acetoacetate.

b. Preparation of a poly(oxypropylene)-(N-cyclohexyl)aminocrotonate

A 10 l round bottomed flask in a temperature controlled heating mantle was fitted with a mechanical stirrer, a nitrogen sparge and a Dean-Stark apparatus. The flask was charged with 9454 g of the poly(oxypropylene)acetoacetate of example 1a, 536 g of cyclohexylamine and 500 g of toluene. The reaction mixture was heated to reflux and water was collected in the Dean-Stark trap.

After 670 minutes the reaction was considered to be complete as indicated by the absence of further water in the Dean Stark trap. Excess cyclohexylamine and toluene were removed by the application of vacuum. The presence of the aminocrotonate was clearly indicated in the spectra of the product. The infrared spectrum showed absorptions at 1650 and 1610 cm$^{-1}$ corresponding to the N—C=C and C=O groups. The $^{13}$C n.m.r. spectrum, in CDCl$_3$ with TMS as reference showed resonances at delta-170 ppm and delta-160 ppm and delta=83 ppm corresponding to the N—C=C, O—C=O and N—C=C carbon atoms respectively.

EXAMPLE 2

Reaction of an enamine-functional polyether with an isocyanate prepolymer

A prepolymer having an isocyanate content of 15.5% was prepared by reacting 22.9 pbw of an all propylene oxide polyether triol having an OH value of 33-35 was added to 44.3 pbw of a stirred 80/20 mixture of 4,4' and 2,4' diphenylmethane diisocyanates. After completion of the polyol addition 22.9 pbw of a polyether diamine (Jeffamine D-2000) were slowly added to the reaction mixture (T=85°-90° C.) After this the reaction mixture was stirred at 90° C. for another 3 hours. Subsequently the prepolymer was cooled down to 45° C. and 9.10 pbw of a uretonimine modified diphenylmethane diisocyanate having an isocyanate content of 29.5% was added. Stirring was continued at this temperature for 15 minutes after which the prepolymer was allowed to cool down to ambient temperature. A clear, yellow liquid product was obtained.

A "B" component was prepared comprising 50 parts of the enamine-functional polyether of example 1, 50 parts of DETDA and 2.5 parts of zinc stearate. Elastomers were prepared by combining respectively 176 (example 2a) and 193 pbw (example 2b) of the prepolymer with 100 pbw of the "B" component on a Battenfeld SHK-65 RIM machine at a mould temperature of 90° C. Properties of the elastomer products thus obtained are stated below:

|  | Example 2a | Example 2b |
|---|---|---|
| Flexural Modulus (MPa) | 731 | 722 |
| Tensile Strength (KPa) | 24048 | 23972 |
| Elong. (%) | 45 | 44 |
| Heat Sag (150 mm O/H, 160° C.) 30' | 25 | 11 |

|  | | Example 2a | Example 2b |
|---|---|---|---|
|  | (mm) 60' | 36 | 16 |
| Impact (J) | +20° C. | 31 | 41 |
|  | −20° C. | 22 | 19 |

Flexural Modulus was determined by ASTM D790, Heat Sag was determined by ASTM D3769-85, Impact (Falling Dart) was determined by ASTM D3024-84.

What is claimed is:

1. An enamine-terminated polyether having the formula:

$$R\left(O-\overset{O}{\underset{\|}{C}}-\underset{CH_3}{C}=\overset{H}{C}-N\overset{R^1}{\underset{R^2}{\diagdown}}\right)_x$$

wherein R is the residue remaining after removal of the hydroxyl groups from a polyether polyol, $R^1$ and $R^2$ are each independently hydrogen or a substituted or unsubstituted hydrocarbon radical, or $R^1$ and $R^2$ together with the attached nitrogen atom from a heterocyclic ring, and x is an integer from 2 to 5.

* * * * *